United States Patent [19]

Hasegawa

[11] Patent Number: 4,837,430
[45] Date of Patent: Jun. 6, 1989

[54] PHOTOELECTRIC TOUCH PANEL HAVING PARALLEL LIGHT EMITTING AND DETECTING ARRAYS SEPARATED BY A LIGHT SHIELD

[75] Inventor: Kazuo Hasegawa, Furukawa, Japan
[73] Assignee: Alps Electric Co., Ltd., Japan
[21] Appl. No.: 125,736
[22] Filed: Nov. 30, 1987

Related U.S. Application Data

[63] Continuation of Ser. No. 830,554, Feb. 18, 1986, abandoned.

[30] Foreign Application Priority Data

Feb. 15, 1985 [JP] Japan ............................. 60-20130[U]

[51] Int. Cl.$^4$ ............................................. G01V 9/04
[52] U.S. Cl. ................................. 250/221; 250/222.1
[58] Field of Search ............................. 250/221, 222.1; 340/555-557, 365 P

[56] References Cited

U.S. PATENT DOCUMENTS 3,764,813 10/1973 Clement et al. ..................... 250/221
4,517,559 5/1985 Deitch et al. ....................... 250/221

Primary Examiner—David C. Nelms
Assistant Examiner—Stephone B. Allen
Attorney, Agent, or Firm—Guy W. Shoup; Paul J. Winters

[57] ABSTRACT

A photoelectric touch panel has light emitting and light sensing elements mounted on the same circuit board located at one side of the panel and a reflector is placed on an opposing side of the panel thus eliminating the need for a second circuit board at the opposing side.

1 Claim, 2 Drawing Sheets

1

PHOTOELECTRIC TOUCH PANEL HAVING PARALLEL LIGHT EMITTING AND DETECTING ARRAYS SEPARATED BY A LIGHT SHIELD

This is a continuation of Ser. No. 830,554, now abandoned, filed 2/18/86.

FIELD OF THE INVENTION

The present invention relates to an improvement of a photoelectric touch panel which detects interruption of a light beam belonging to a lattice of beams formed over the touch panel and outputs coordinate information indicating the position of the interruption by detecting which beams in the lattice were interrupted.

BACKGROUND OF THE INVENTION

Shown in FIG. 2 is a conventional photoelectric touch panel of this type. Namely, in FIG. 2, 1a and 1b are circuit boards with light emitting elements mounted thereon, while 2a and 2b are circuit boards (substrates) with light sensing elements mounted thereon. The light emitting element substrates 1a, 1b and light sensing element substrates 2a, 2b are opposingly arranged to form a box-like frame which is mounted in front of a video display screen, for example (not shown).

The light emitting element substrates 1a, 1b are provided with the light emitting lements (LED's) 3 in a line or in a curve fitting to the curvilnear surface of the video display in order to alleviate parallax, while the light sensing element substrates 2a, 2b are provided with light sensing elements 4 also in a line or in a curve fitting to the curvilinear surface of the display screen. The substrates also have a number of integrated circuit components (IC's) 5 acting as switching circuits.

In a photoelectric touch panel of this arrangement, the light of the LED's 3 is sequentially scanned across the surface of the display forming a lattice of infrared beams 6 and addresses are assigned to each photoelectric element along the axes. Beam interruption coordinates can be determined according to which LED 3 emits light and which light sensing element 4 senses the light during a scan cycle. When a displayed image is pointed to with a finger or a touch pen, the infrared beams 6 at that point are interrupted and the X-Y coordinates of the interrupted infrared beams 6 are sent to a computer. If the pointer (finger) also blocks the infrared beams 6 of adjacent rows and columns, the intended center position can be obtained by averaging the coordinate information received by the computer. Various measures are taken for rejecting invalid touches using logic circuits and random disturbances of the light are compensated by a compensating circuit.

However, in such a photoelectric touch panel, a wiring circuit needs to be formed on each substrate of the frame, making the device complicated, its assembly difficult and preventing reduction in size.

SUMMARY OF THE INVENTION

It is an object of the present invention to provide a photoelectric touch panel which eiminates such disadvantages of the prior art and facilitates manufacture using a simplified circuit arrangement which permits reduction in size.

In order to attain this object, according to the present invention, the light emitting elements are provided on the same side of the panel instead of on opposing sides and a reflector is provided on the opposite side of the panel.

DETAILED DESCRIPTION OF THE INVENTION

A preferred embodiment of the present invention is explained with reference to the accompanying drawings.

Figure 1:
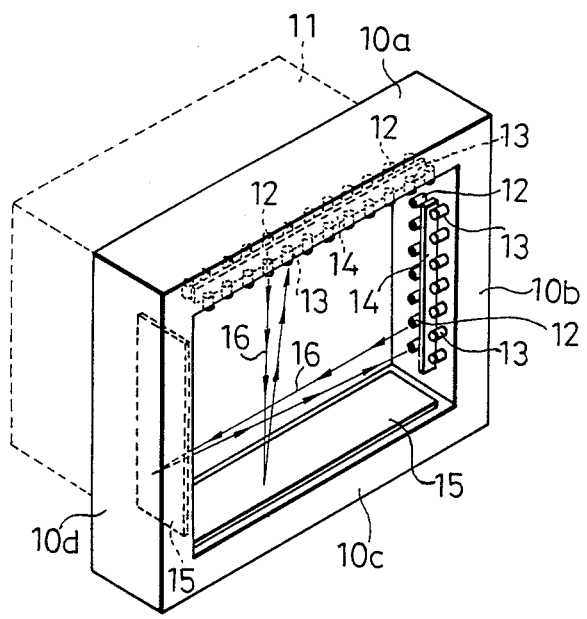
FIG. 1 is a perspective view indicating an embodiment of the present invention.
Figure 2:
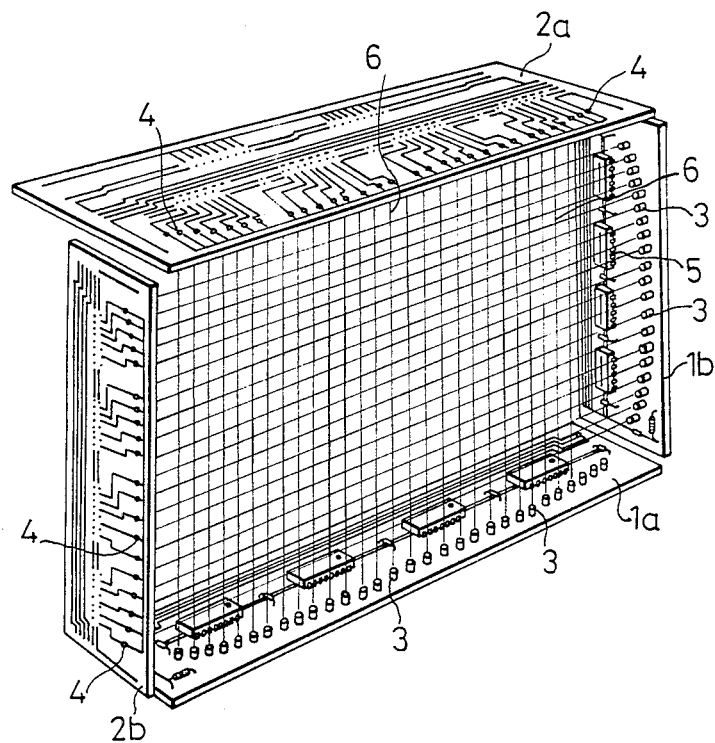
FIG. 2 is a perspective view of the prior art.

In FIG. 1, 10a, 10b, 10c, and 10d are four side portions which are assembled like a frame and affixed to the periphery of the display screen of a display unit 11. Adjoining sides 10a and 10b are arranged like the letter L and are provided with the light emitting elements (LED's) 12 in a line. Moreover, light sensing elements, (phototransistors) 13 are provided in parallel to the LED's 12 and a shielding plate 14 is provided between each row of phototransistors 13 and LED's 12 so that the photoransistors 13 do not directly receive the light sent from the LED's 12.

Meanwhile, the second side 10c opposing the first side 10a, and the fourth side 10d opposing the third side 10b, are respectively provided with a reflector 15 such as a mirror which reflects the light beam emitted from the LED's 12.

Here, the light beam 16 emitted from the LED 12 is reflected by the reflector 15 and is sensed by the phototransistor 13. A lattice of light beams 16 is formed across the frame formed by the sides 10a and 10b. Input of data can be realized, as in the prior art, by interrupting tht light beam 16 when touching the display screen of the display unit 11 with a finger or touch pen, etc.

As explained above, according to the present invention, since the light emitting elements and light sensing elements can be arranged on the same substrate, the circuit, particularly the wiring, can be simplified, assembly is simplified and the size of the device can be reduced.

We claim:

1. A photoelectric touch panel comprising:
a rectangular frame defining a planar area for a matrix of light beams which is disposed in front of an associated display screen;
two light detection assemblies perpendicular to each other, each assembly being disposed in parallel with the matrix plane on a respective one of two adjcent sides of said rectangular frame, each assembly consisting of a row of light emitting elements in parallel with a row of light detecting elements, both rows being aligned in parallel with said matrix plane with each of the light emitting elements being positioned spaced apart in a direction perpendicular to said matrix plane from a corresponding one of the light detecting elements, and a light shielding plate arranged upright and extending longitudinally between the two rows of light emitting and light detecting elements, wherein the row of light emitting elements is disposed between the light shielding plate and the display screen; and
two light reflecting members perpendicular to each other, each member being disposed in parallel with the matrix plane on a respective one of the other two adjacent sides of said rectangular frame facing opposite a respective one of the two light detection assemblies, each member consisting of a single planar reflecting plate for reflecting and returning light emitted by each of said light emitting elements of the light detection assembly across said matrix plane to the corresponding ones of said light detecting elements if the respective light beams therefore are not interrupted by an object interposed in said matrix plane, wherein said single planar reflecting plate is oriented perpendicular to said matrix plane and parallel with light to said rows of light emitting and detecting elements.

* * * * *

UNITED STATES PATENT AND TRADEMARK OFFICE
CERTIFICATE OF CORRECTION

PATENT NO. : 4,837,430

DATED : June 6, 1989

INVENTOR(S) : Kazuo Hasegawa

It is certified that error appears in the above-identified patent and that said Letters Patent is hereby corrected as shown below:

Col. 4, line 1, "therefore" should be --therefrom--.

Signed and Sealed this

Twentieth Day of March, 1990

Attest:

JEFFREY M. SAMUELS

Attesting Officer

Acting Commissioner of Patents and Trademarks